Feb. 18, 1947. L. NAST 2,415,961
MOLD FOR PRODUCING SHAPES OF PLASTIC MATERIAL
Filed Sept. 22, 1944 2 Sheets-Sheet 1
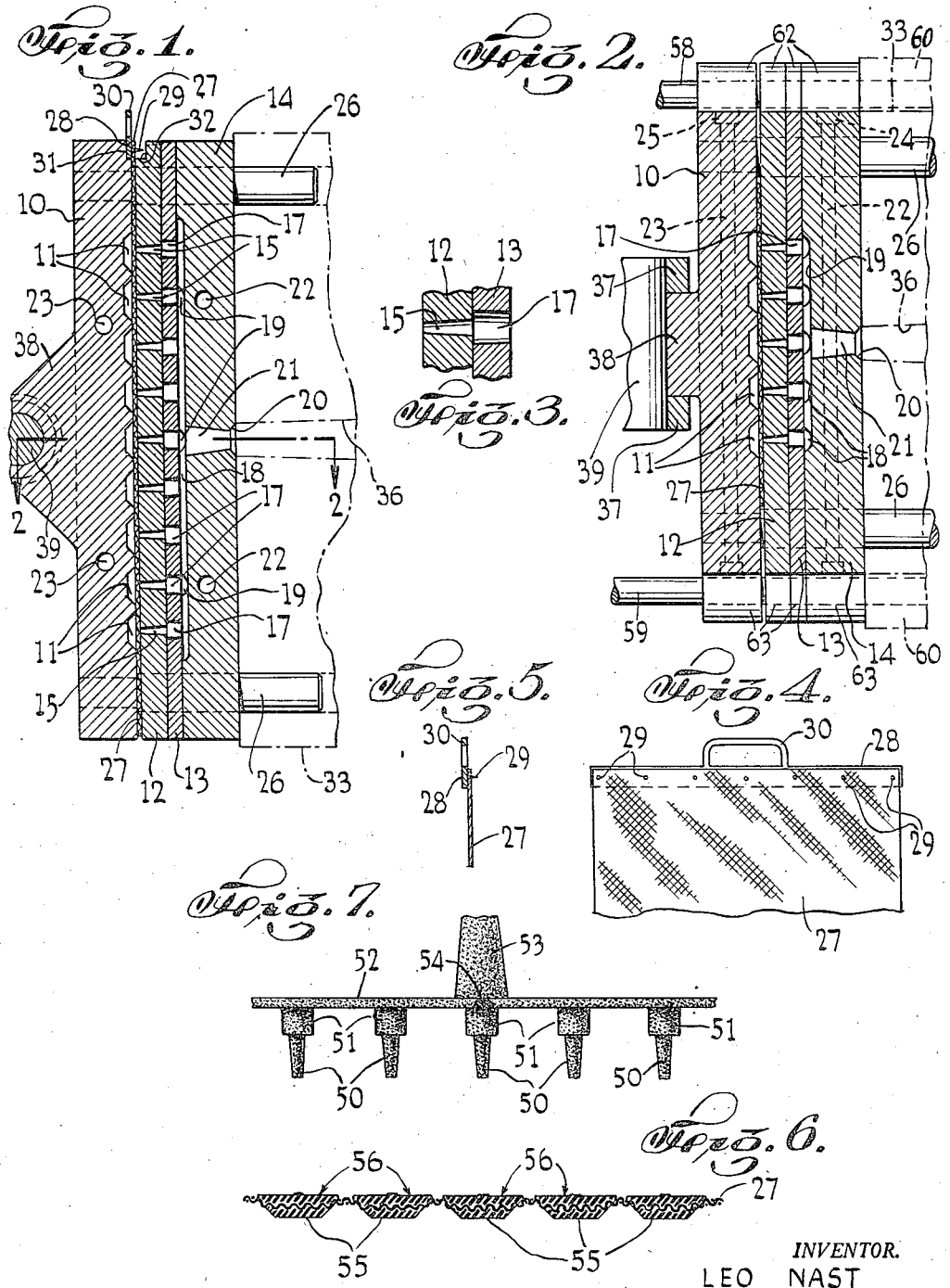
INVENTOR.
LEO NAST
BY J. O. Ollier,
ATTORNEY

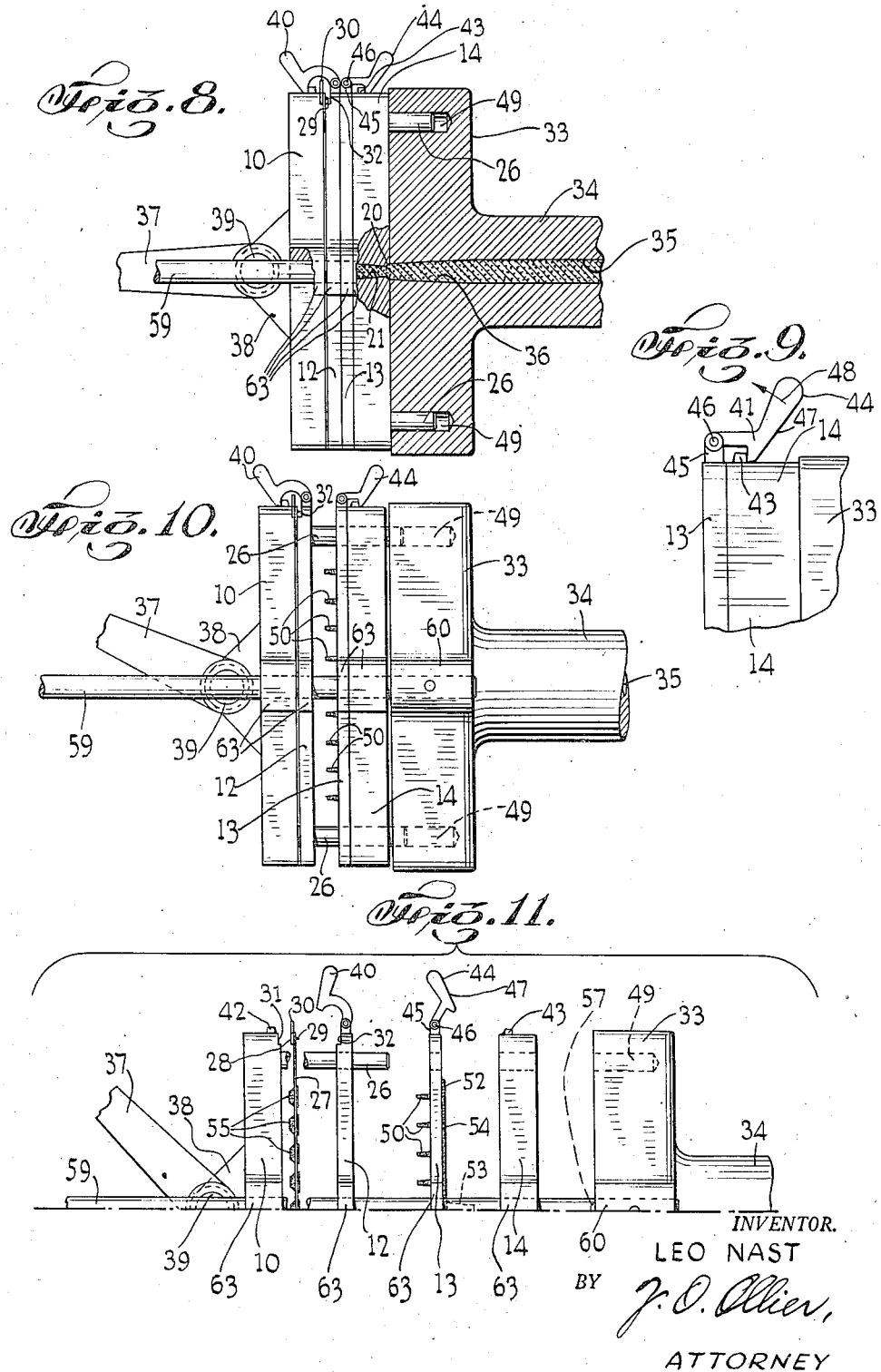

Patented Feb. 18, 1947

2,415,961

UNITED STATES PATENT OFFICE 2,415,961

MOLD FOR PRODUCING SHAPES OF PLASTIC MATERIAL

Leo Nast, Fanwood, N. J.

Application September 22, 1944, Serial No. 555,234

7 Claims. (Cl. 18—42)

This invention refers to a press and mold for manufacturing therein decorated materials and trimmings for any purpose, in particular to a material for making upholstery for furniture, pocketbooks, belts, shoe trimmings, picture frames, book covers.

I suggested in my earlier Patent No. 2,302,342 a process and mold for providing a preferably sheet-like and somewhat porous or fibrous base, in particular a fabric of any material, such as cotton, natural or artificial silk, wool, asbestos, or any mixture thereof, on one or both sides with ornaments of any shape, size and configuration made of moldable plastic material. As moldable material a thermoplastic material such as cellulose acetate is preferred. The moldable plastic material may be of any desired color, and in particular a plurality of ornaments applied to the base material, may be of the same or different colors. The material may also be either opaque, translucent or transparent.

The moldable plasticised material is caused to penetrate through the pores or interstices of the base during the manufacture of the individual ornaments and some of the material remains within the pores or interstices and thereby secures a permanent connection between the ornament and the base.

In manufacturing decorated materials and trimmings of the type referred to above, a multiple mold comprised of several sections is used and channels and passages are provided in several of them for feeding under pressure the plasticised moldable material through the sheet-like and somewhat porous or fibrous base into the multitude of mold cavities provided in one of the sections. The plastic material solidifies within these channels and passages and difficulties were encountered in removing it after molding is completed and the mold opened. In particular, the solidified material in the tapered holes or funnels opening toward the mold cavities was torn off within those funnels when the mold was opened, leaving a kind of stopper in those funnels which to remove required additional time and labor.

It is therefore an object of the invention to provide a mold for the manufacture of decorated material of the kind referred to hereinbefore in which these difficulties are eliminated.

It is another object of the invention to provide a multiple section mold for feeding under pressure plasticised moldable material of the kind referred to hereinbefore, into a plurality of mold cavities provided in a section of the multiple mold in which the removal of the solidified plastic material from the passages and channels of other sections of the opened mold is facilitated.

These and other objects of the invention will be more clearly understood as the specification proceeds with reference to the drawings in which Fig. 1 is a cross-section, with parts in elevation, through a multiple section mold according to the invention with its sections spaced from one another and the porous base between two adjacent sections thereof, Fig. 2 a cross section along line 2—2 in Fig. 1, with the mold sections pressed together, Fig. 3 a cross section through adjacent sections of the mold showing a modification of the invention, Fig. 4 an elevation, and Fig. 5 a side view of means for inserting and removing the porous base into and from the space between two adjacent sections of the mold, Fig. 6 a cross section through the base material with ornaments of plastic material molded therethrough and thereon, Fig. 7 a side elevation of a portion of the plastic material solidified within the channels and passages of several mold sections, Fig. 8 a rather schematical side elevation with parts in cross section of a portion of a machine for injection molding ornaments of plastic material through and onto a porous base, with a closed mold according to the invention, Fig. 9 a side elevation of a clamp used in connection with said mold, Figs. 10 and 11 side elevations similar to that of Fig. 8 with the mold partly and completely opened, respectively.

It should be understood that the drawings exemplify preferred features of the invention which is equally useful for molding under pressure ornaments of plastic material through and onto a porous base as well as for molding individual articles in each mold cavity without the use of such a base.

Referring to Figs. 1 and 2, the multiple section mold consists essentially of a plate 10 provided with mold cavities 11 on one side. Any desired number of such cavities can be provided and the shape and size of the cavities can be equal or different inter se. For simplicity's sake, cup-shaped cavities of the same size and shape are exemplified in the drawings. The cavities are preferably arranged in rows; Fig. 2 exemplifies five such rows.

The mold further comprises three other essential sections in the form of plates 12, 13 and 14. Section or plate 12 is traversed by a number of funnel-like holes 15 tapering toward the adjacent section or plate 10 and opening in front and preferably in the center of a mold cavity 11. Section or plate 13 is traversed by passages or holes 16, their number equalling that of funnels 15 and in alignment with the latter. However, the diameter or cross-sectional area of holes or channels 16 substantially exceeds the diameter or cross-sectional area of the adjacent opening of a funnel 15. While it is assumed for simplicity's sake that the funnels 15 are conical and the channel 16 cylindrical, the latter may also be made for instance conical, as shown at 17 in Fig. 3, slightly tapering toward section 14; the largest diameter or cross-sectional area of passage 17, is, however, also in this case substantially larger than the largest area of funnel 15 in the surface of section 12 facing section 13.

Section or plate 14 is provided with a number of rather shallow inlet grooves or passages 18 open toward section or plate 13 and in substantial alignment with the adjacent openings of passages 16. The number of inlet passages 18 corresponds to the number of rows in which the holes 16 and connecting funnels 15 are arranged. As can be seen from Fig. 2 five such rows are provided in this exemplification of the invention and therefore five substantially parallel passages 18. The parallel passages 18 communicate with one another through one or more shallow cross-passages or grooves 19. 20 indicates an inlet and 21 an outlet portion of a channel, particularly injector nozzle through which the plasticised moldable material is pressed into the shallow passages 18 and 19; portions 20 and 21 taper toward one another. Channels 22 and 23 cross section 14 and 10, respectively, for leading therethrough any suitable cooling medium, particularly liquid, and can be arranged in any desired number; their ends 24, 25 are for instance screw-threaded for receiving any suitable conduits such as flexible tubes for the cooling medium.

Bolts or dowels 26 in any desired number are mounted in section or plate 10 and pass aligned bores in the other sections which can slide on the bolts.

The porous base material through and onto which the ornaments of plastic material are to be molded, for instance a sheet of fabric 27 is removably fastened on a flat bar 28 by means of pins 29 provided on one side of the bar. A handle 30 facilitates placing bar 28 into a recess 31 of section or plate 10 so that sheet 27 lies flat between the adjacent sections 10, 12; the latter is provided with a recess 32 into which pins 29 project.

The multiple section mold is removably mounted in an injection machine for plastic moldable material of any well known type, for instance as shown more in detail in my above mentioned Patent No. 2,302,342. Section 14 faces plate 33, Figs. 8, 10 and 11, on a pressure cylinder 34 of the machine. Cylinder hole 35 and nozzle 36 open in front of and in alignment with inlet 20, Figs. 1, 2, of the feeding-in channel in plate 14. Means for mounting rigidly but removably the multiple section mold in the injection machine, for guiding the sections relative to one another, and for closing and opening manually or automatically the multiple mold are well known in the art, and described in my above mentioned patent, so that these details as well as known means for feeding powdered moldable material into cylinder hole 35, for plasticizing it therein and for pressing or injecting it through nozzle 36 into inlet 20, are omitted for simplicity's sake. It is assumed in this exemplification that the multiple section mold is closed and opened manually by means of toggle levers one of which, 37, is shown in Figs. 8, 10, 11 in different positions corresponding to the stages of operation illustrated in those figures. Fig. 8 shows a mold closed, Fig. 10 opened in part, and Fig. 11 opened completely, and consequently lever 37 is shown in Fig. 8 in a position corresponding to the fully stretched or straightened out toggle levers, in Fig. 10 in somewhat inclined and in Fig. 11 in still more oblique position. Levers 37 are pivotally connected with plate or section 10 by means of lug 38 and pin 39.

Sections 10, 12 and 13, 14 are temporarily clamped together, respectively, for instance by means of latches 40, 41 pivotally attached to sections or plates 12, 13, respectively, and engaging detents 42, 43 on sections 10, 14, respectively. Fig. 9 shows on a larger scale this exemplification of the clamping means between sections 13 and 14. Latch 41 is provided with a handle 44 or other actuating means and is pivotally connected with section 13 by means of eyes 45 and pin 46. Latch 41 is further provided with a sloping front face 47 so that upon closing the mold, face 47 glides over detent 43 and the latch falls by action of gravity or of a spring interposed between eye 45 and latch 41 (not shown) into the clamping position shown in Fig. 9. Upon turning latch 41 manually by means of handle 44 in the direction of arrow 48, the temporary connection between sections 13 and 14 is removed and the sections can be separated. The other latch 40 and detent 42 cooperate in a similar manner.

The free ends of bolts 26 engage aligned holes 49 in plate 33; bolts 26 and holes 49 are long and deep enough to engage one another in any relative position of the mold sections shown in Figs. 8 and 10.

In operation, a suitably cut piece of porous base material 27 is fastened onto bar 28 and placed between the separated mold sections 10, 12 so that bar 28 engages recess 31 and pins 29 project into recess 32. Thereupon the mold is closed by straightening out the toggle levers; thereby the mold sections are pressed together and against plate 33, and in particular mold sections 10 and 12 are pressed from opposite sides against the porous base 27, and latches 40, 41 fall automatically or are moved manually into their respective clamping position. Plastic moldable material which has been heated and plasticised for instance while the base 27 is placed in the open mold and the latter thereafter closed, is now pressed or injected from cylinder hole 35 through nozzle 36 into and through passages 20, 21 into all the passages 18, 19 communicating therewith, and thence into and through all the passages 16, 15 and through the pores or interstices of base 27 into cavities 11. After all the permeated pores or interstices of the base and the cavities have thus been filled rapidly, pressure is maintained in cylinder hole 35 upon the plasticised material therein, so as to press additional plasticised material in the manner described into the mold cavities and to compensate for shrinkage upon cooling of the previously fed material.

After molding of the ornaments through and onto the porous base 27 has been thus completed, pressure upon the plasticised material in cylinder hole 35 is released and opening of the mold started. To this effect the toggle levers are broken off to an extent in which lever 37 assumes the position illustrated in Fig. 10; due to the fact that the pairs of mold sections 10, 12 and 13, 14 are clamped together respectively by the latches 40, 41, mold sections 13, 14 remain in or close to the position had during molding, whereas sections 10, 12 are moved away from them. Since no considerable power is needed for this separating of the mold sections, a single latch or other clamping means to connect each pair of them usually suffices; however, in order to prevent jamming of the connected sections if they are of larger size, additional clamping means can be provided in preferably symmetrical arrangement, and connected by a suitable mechanism with a single handle or other actuating means in order to simplify operation.

It will be appreciated that the plastic material pressed into the mold solidified in the mold cavities 11 and also where it penetrated the pores of base 27; it also solidified, however, within the communicating passages 15, 16, 18, 19, 20 and 21. By moving the pairs of temporarily held or clamped together sections 10, 12 and 13, 14 away from one another and plate 33 into the positions shown in Fig. 10, solidified material within mold cavities 11 and within the pores or interstices of base 27 is firmly held in that position by sections 10, 12, whereas the portions of solidified material within funnels 15 are drawn out of the funnels due to their coherence with the portions of solidified material within the holes 16 of larger cross-section in section 13. Thereby the solidified portions in the feeding passages or funnels are torn off from the molded and solidified portions within base 27 and mold cavities 11, such tearing off occurring at the place of least resistance, i. e. where the smallest cross sections prevail which is at or close to the ends of funnels 15 facing base 27. For similar reasons, the solidified stub held in inlet portion 21 is torn off the solidified material in inlet portion 20 which remains connected with the material in nozzle 36.

Fig. 7 shows a part of the solidified plastic material which thus remains in the holes 16 and passages 18 and 21 of sections 13, 14; the tapered portions or stubs 50 being the ones solidified within funnels 15, the portions 51 those solidified within holes 16, the portion or branches 52 molded within passage 18, and the portion or stub 53 molded within inlet portion 21; portions or branches molded within cross-passages 19 are shown broken off at 54.

In Fig. 10 portions or stubs 50 drawn out of funnels 15 upon opening of the mold and still connected with the other portions within the clamped together section 13, 14, are shown.

Now the clamps or latches 40, 41 are lifted and the toggle levers moved in their final broken off position in which lever 37 has its greatest incline, shown in Fig. 11. Section 10 is now farthest from plate 33; section 12 is spaced from section 10; and section 13 has been moved away from section 14 but is spaced from section 12. This movement of the sections can be effected by hand, or automatically by suitable mechanisms such as cam drives actuated by a hydraulic or a servo-motor in timed relation. Such automatic means are well known per se and not shown because they do not form a subject matter of this invention. It suffices to say that in an automatic operation of the machine can also be included the properly timed closing and opening of the latches 40, 41 or of other connectors or clamps replacing them.

In the fully open position of the mold shown in Fig. 11, base 27 with the desired ornaments 55 molded thereon can be removed by lifting bar 28 by means of handle 30, as shown in Fig. 11.

Another bar 28 with a new sheet 27 pinned thereon can now be inserted between the spaced sections 10, 12; sheet 27 with ornaments thereon is removed from bar 28 on another place.

By moving section 13 away from section 14, the solidified portions 52, 53, 54 are drawn out of passages 18, 19 and 21 in section 14 because of their connection with the solidified material in the holes 16; the removal of the branches 52, 54 and stub 53 from the corresponding passages can be additionally secured by the use of slightly tapering holes 17, Fig. 3, instead of cylindrical holes 16, Fig. 2. The portion 53 of solidified material in inlet 20 was torn off from the other portion within inlet 21 by moving section 14 slightly from plate 33; stub 57, Fig. 11, is the portion thus removed from inlet 20 and still connected with the moldable material within injection nozzle 36.

Now the solidified material still in holes 16 can be removed manually, or section 13 can be replaced by another one from which the solidified material from a previous injection cycle has been knocked out, for instance in a known "arbor press." A new porous sheet 27 is placed between sections 10, 12 while section 13 is being cleared or replaced, and the cycle of operation just described repeated.

Sections 10, 12 and 13 are provided with lateral hook-like eyes 62, 63 which grip from above only and glide on guiding and supporting rods 58, 59 mounted at one end in lugs 60 of plate 33 and at the other end in a machine support (not shown). Section 13 can therefore be lifted from those rods when the dowels 26 are withdrawn from it in the position shown in Fig. 11.

The porous base 27 with molded ornaments 55 thereon is shown on a larger scale in Fig. 6; the base is somewhat bulged within each ornament in the direction of the pressure under which the plasticized material was forced onto and through the porous base. This bulging will mostly occur if the base is a fabric which gives under the pressure of the penetrating plasticized material, and is advantageous in that the molded ornaments are thereby more firmly anchored in the base.

It was common practice heretofore to use a single section crossed by funnel shaped channels through which plasticized material was fed into the mold cavities. Thereby relatively long stubs of solidified material resulted in each funnel which had to be torn off from the solidified material (ornaments or articles) in the mold cavities. It often happened that the stubs were torn off at their ends close to the molded shape but at another place within the funnel. Though tearing off should occur at the place of lowest resistance, due to the length of each funnel and its slight taper, its cross sections did not differ enough so as to properly define the place of lowest resistance and tearing off. However, if the solidified stub tears off within the funnel, either a kind of stopper is left in the latter which to find and remove causes difficulties, or that stopper remains connected with the molded shape and requires difficult and costly removal from the shape. The invention therefore provides two adjacent sections 12 and 13 instead of a single one, and subdivides the feeding passages traversing them and leading to the mold cavities into two portions; at least the one 15 discharging into the cavity 11 is funnel-shaped, and the other portion 16 is of substantially larger cross sectional area. Due to the larger cross sectional area of the solidified material within the passages 16, its tearing off is excluded. The funnels 15 in section 12 can be shorter than usual and therefore taper at a gentle incline, whereby the place of least resistance of the material solidified therein is far better defined than heretofore. Experience shows that upon opening the mold, the stubs 50 formed within funnels 15 will be torn off from the solidified material 55 molded in the cavities 11 in or close to surface 56, Fig. 6, of those ornaments or molded portions of utility.

The solidified plastic material as illustrated in Fig. 7, can be powdered again and utilized in another cycle of the same or another machine.

It will be appreciated that by omitting sheet 27 and its holder 28, 30, a mold of the type exemplified herein can be used to advantage for manufacturing a number of individual molded shapes in the cavities 11; in such case, sections 10 and 12 of the closed mold will be clamped and pressed upon one another immediately, i. e. without any space between them otherwise occupied by that sheet. Upon opening of the mold, the shapes 55 molded therein by injecting the plasticized material, will not be connected with one another and are therefore ejected individually from the cavities by well known ejector means, for instance pins fitting into and passing slideably through holes traversing section 10 from its outside to the bottom of each cavity 11. Ejector arrangements of this or similar kind are well known in the art and therefore not shown.

It should be further understood that the invention is not limited to its exemplifications herein contained but to be derived in its broadest aspects from the appended claims.

What I claim is:

1. A multiple section mold for molding therein under pressure a plurality of shapes of plastic material of the type herein concerned, essentially comprising, in combination, four complementary sections in the order named, a first section provided with a number of mold cavities open toward a second section, a second section traversed by funnel-shaped passages the same in number as said cavities and aligned with and tapering toward them, a third section traversed by passages the same in number as and aligned with said funnel-shaped passages and each having a cross sectional area considerably larger than the largest cross sectional area of the aligned funnel-shaped passage, and a fourth section provided with shallow passages on its front side facing said third section and open toward the latter and communicating with an inlet channel traversing said fourth section towards its opposite face, said shallow passages adapted to communicate with said passages traversing said third section, and means for temporarily holding together respectively said first and second sections and said third and fourth sections, so that upon closing the mold and pressing together the four sections in the order named, plasticised material can be pressed through said inlet, shallow and traversing passages of the fourth, third and second sections into said mold cavities, and upon subsequent partly opening the mold the held together first and second sections can be separated from the held together third and fourth sections, and upon subsequent release of their temporary connection all four sections can be spaced from one another.

2. In a multiple section mold as set forth in claim 1, said passages traversing said third section tapering toward said fourth section.

3. In a multiple section mold as set forth in claim 1, means as exemplified by a bar provided with pins on one side, for holding and positioning a porous base between said first and second sections when the mold is open and said sections are spaced from one another.

4. In a multiple section mold as set forth in claim 1, means as exemplified by a bar provided with pins on one side, for temporarily holding a porous base, and recesses on juxtaposed sides of said first and second sections for receiving said means, so that said holding means with porous base temporarily fastened thereto can be positioned between said first and second sections when the mold is open and said sections are spaced from one another.

5. A multiple section mold for molding therein under pressure a plurality of shapes of plastic material of the type herein concerned, essentially comprising, in combination, four complementary sections, a first section provided with a number of mold cavities open toward a second section, a second section traversed by funnel-shaped passages the same in number as said cavities and aligned with and tapering toward them, a third section traversed by passages the same in number as and aligned with said funnel-shaped passages and each having a cross sectional area considerably larger than the largest cross sectional area of the aligned funnel-shaped passage, a fourth section provided with shallow passages on its side facing said third section and open toward the latter and communicating with an inlet channel traversing said fourth section towards its opposite side, said shallow passages arranged to communicate with said passages traversing said third section, said sections adapted to be pressed together to form a closed mold and to be separated from another when the mold is being opened fully, and means for temporarily holding together respectively said first and second sections and said third and fourth sections while the mold is being opened.

6. A multiple section mold as set forth in claim 1, in which said third section is completely removable from the open mold.

7. A multiple section mold as set forth in claim 5, in which said third section is completely removable from the fully opened mold.

LEO NAST.

REFERENCES CITED

The following references are of record in the file of this patent:

UNITED STATES PATENTS

| Number | Name | Date |
|---|---|---|
| 2,302,342 | Nast | Nov. 17, 1942 |
| 285,944 | Swarovski | Apr. 27, 1943 |